Nov. 20, 1962 G. H. LOGEMANN ET AL 3,064,407
CLOSURE MACHINE FOR FOIL PANS AND THE LIKE
Filed Dec. 24, 1959 15 Sheets-Sheet 1

Inventors
George H. Logemann
and John Georgeoff
By Manns, Brown and McWilliams
Attys.

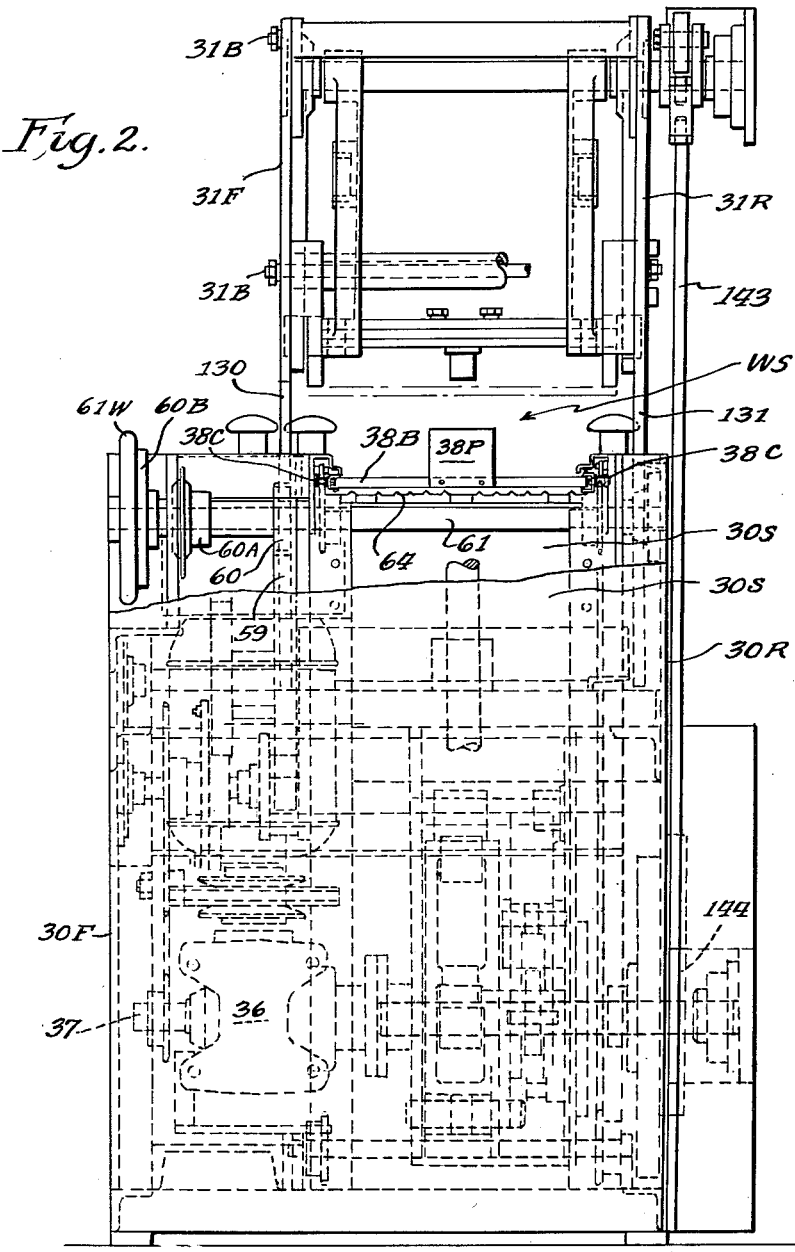

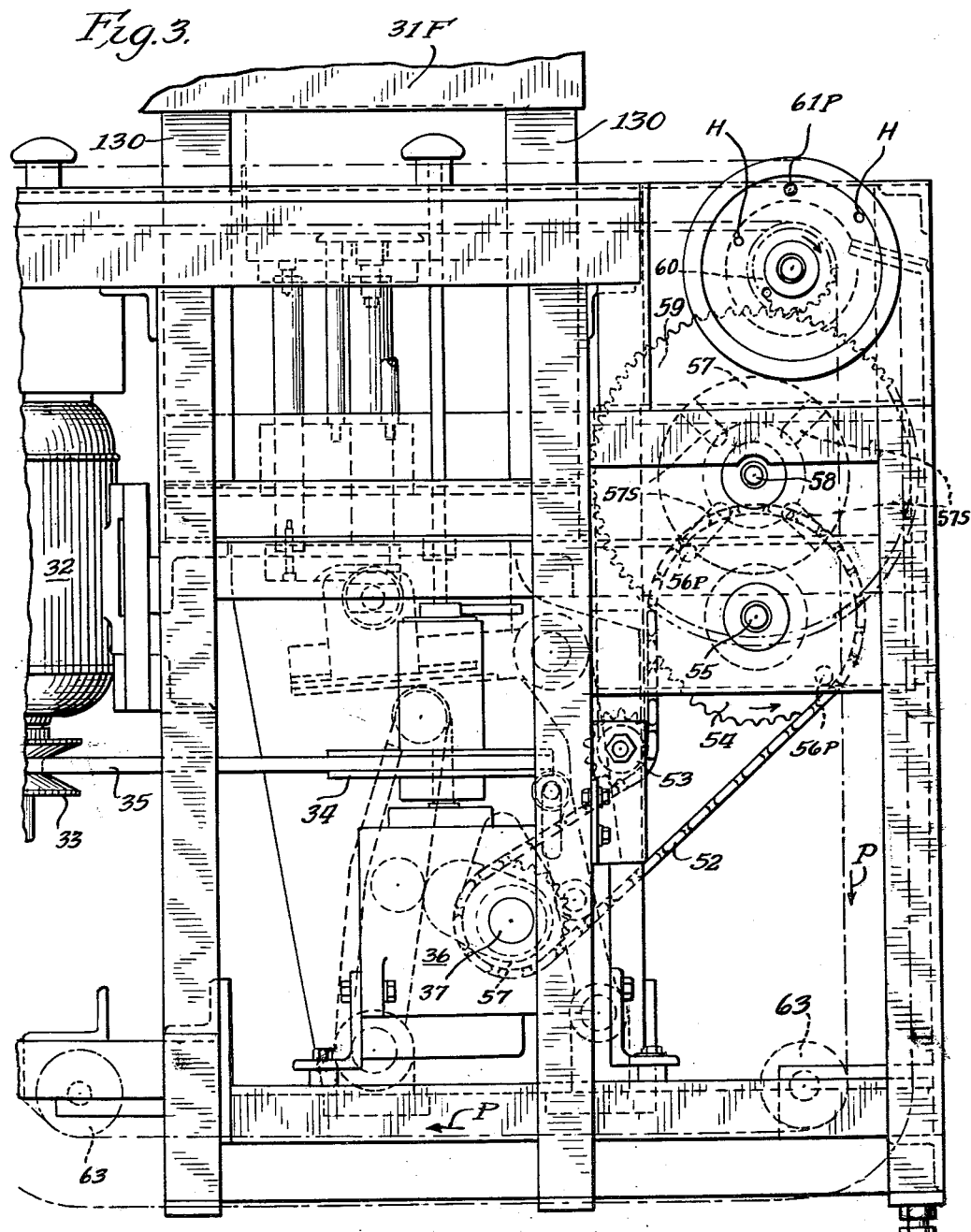

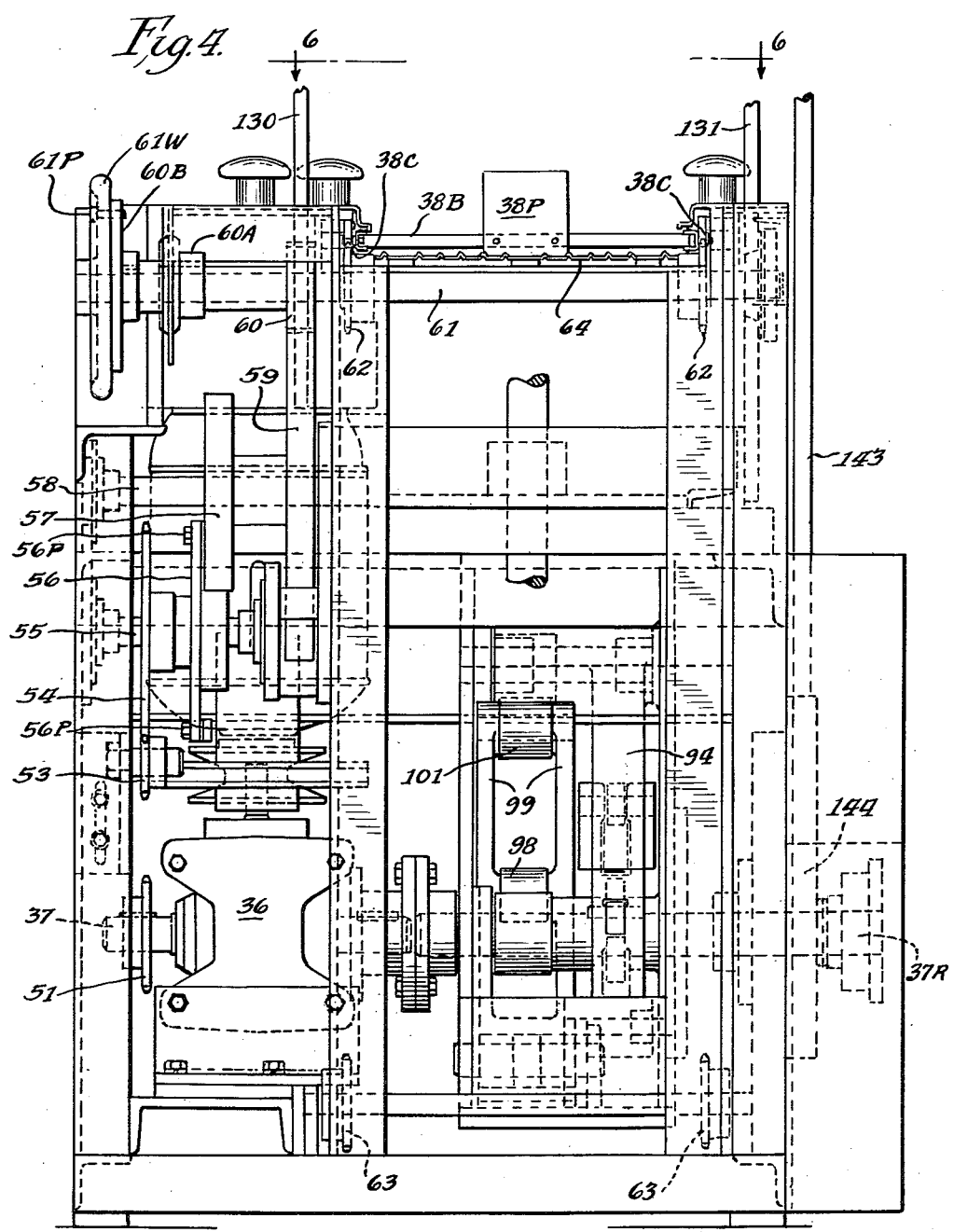

Nov. 20, 1962 G. H. LOGEMANN ET AL 3,064,407
CLOSURE MACHINE FOR FOIL PANS AND THE LIKE
Filed Dec. 24, 1959 15 Sheets-Sheet 5
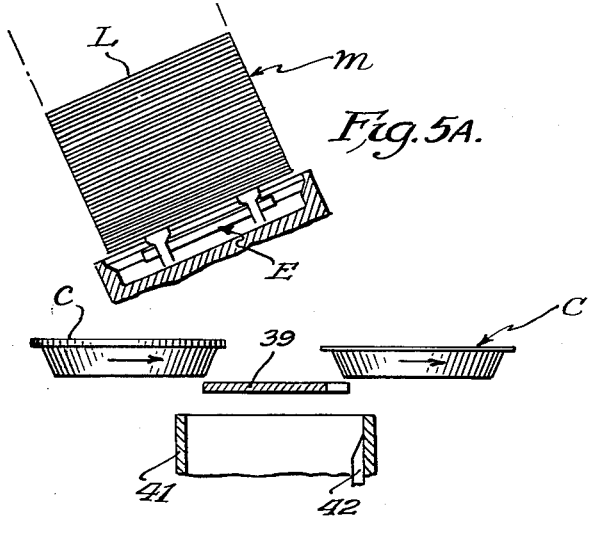
Fig. 5A.
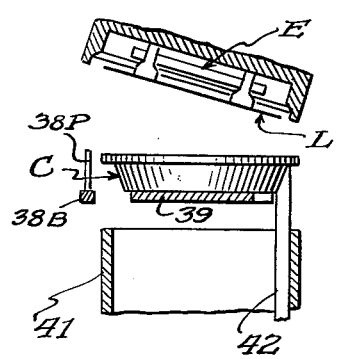
Fig. 5-B.
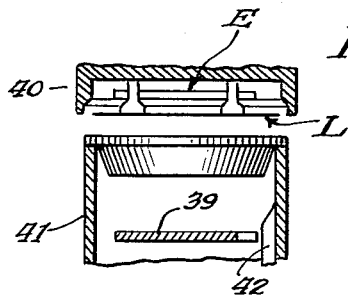
Fig. 5C
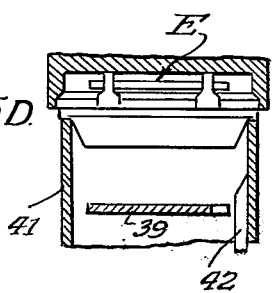
Fig. 5D.
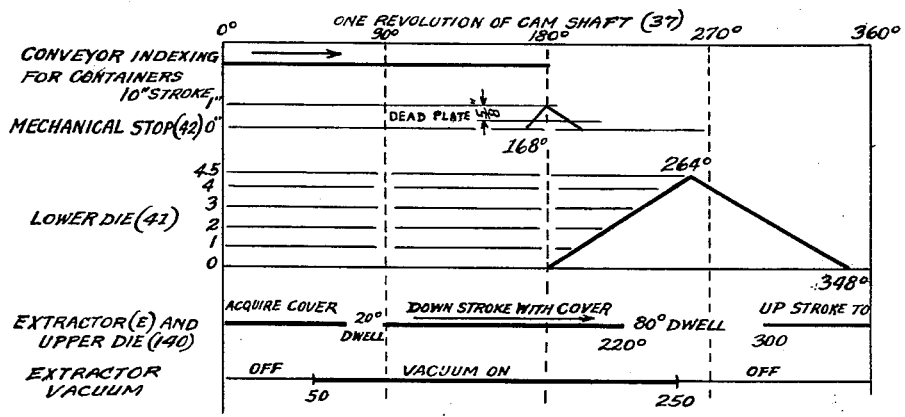
Fig. 5E.
Inventors
George H. Logemann
and John Georgeoff
By Mann, Brown and McWilliams
Attys.

Nov. 20, 1962  G. H. LOGEMANN ET AL  3,064,407
CLOSURE MACHINE FOR FOIL PANS AND THE LIKE
Filed Dec. 24, 1959  15 Sheets-Sheet 6

Inventors
George H. Logemann
and John Georgeoff.

By Mann, Brown and McWilliams
Attys.

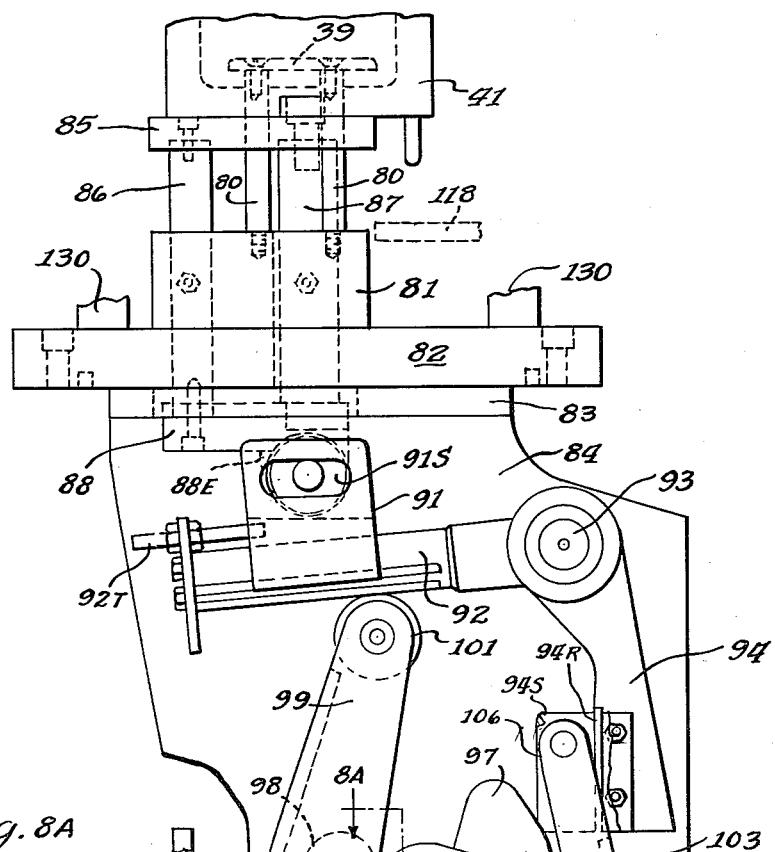
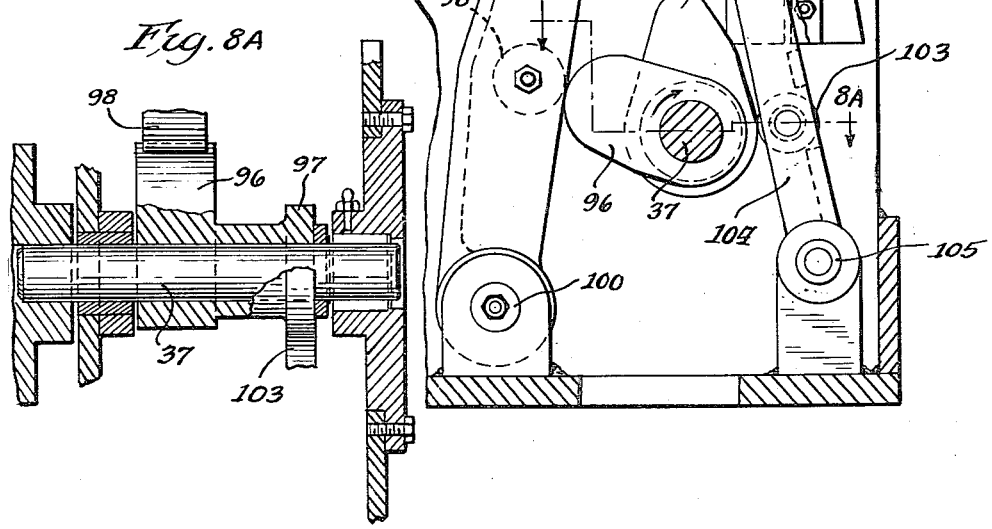

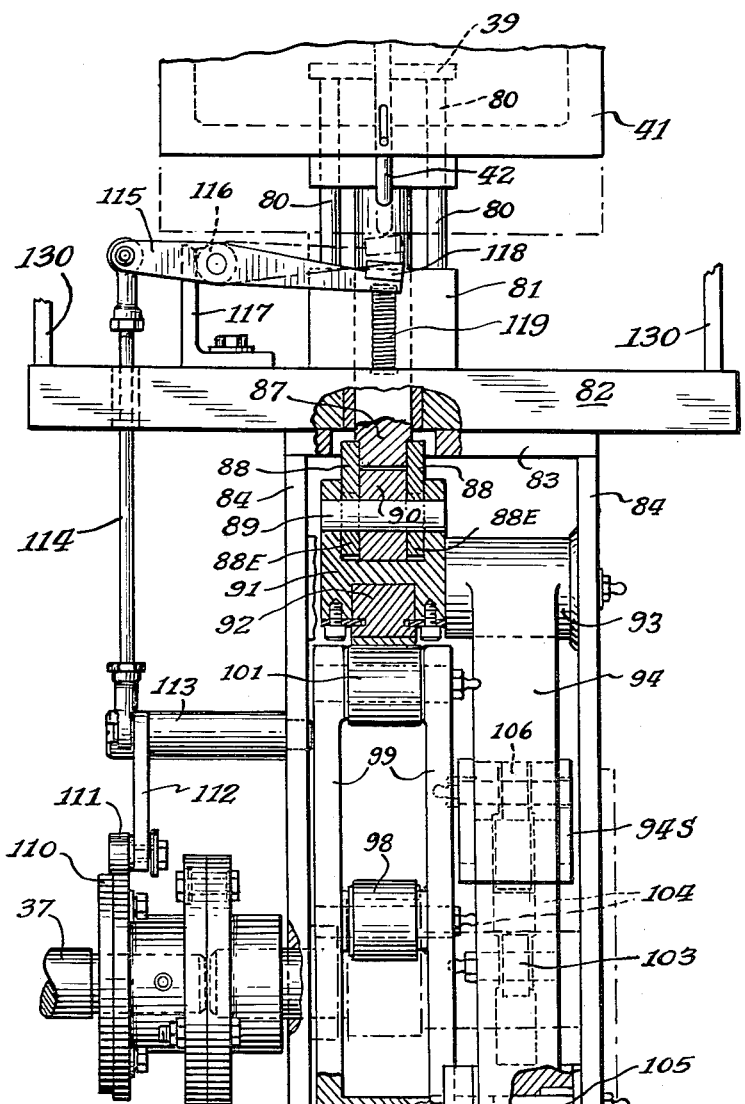
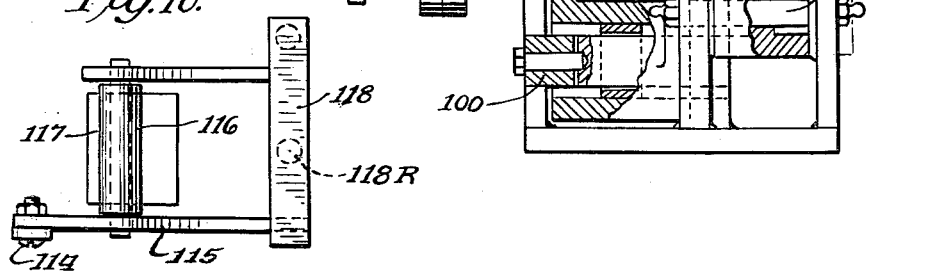

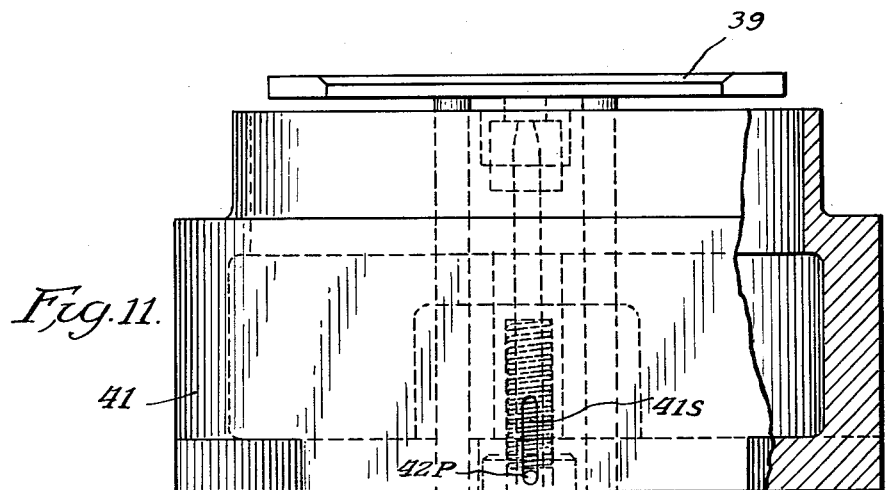
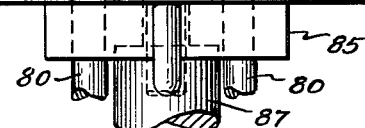
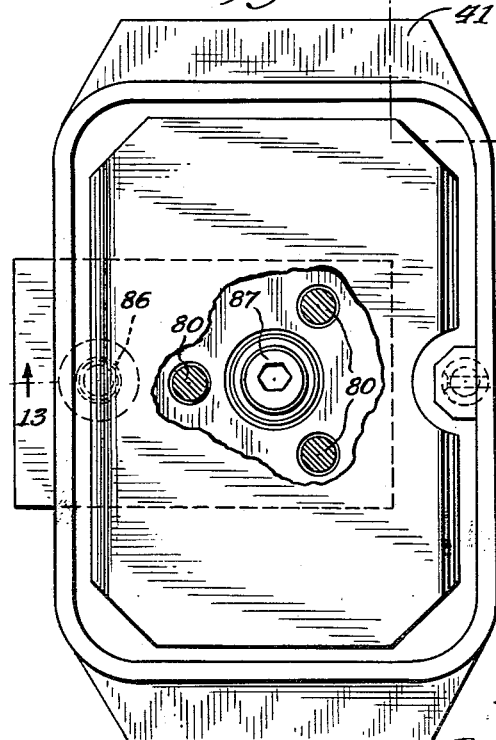
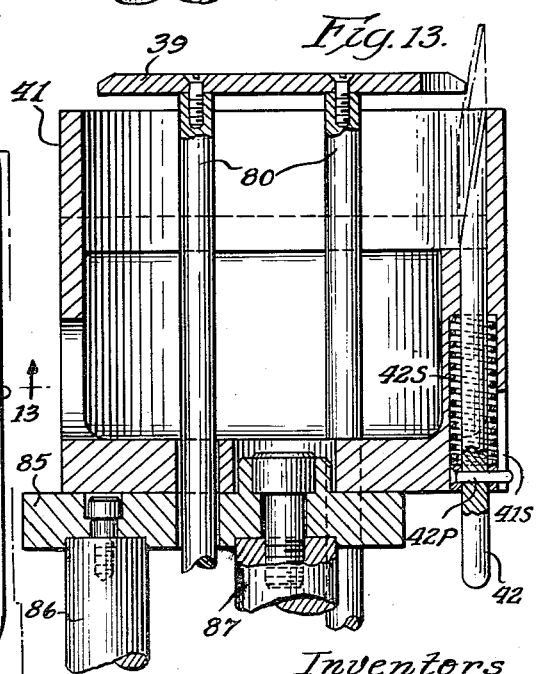

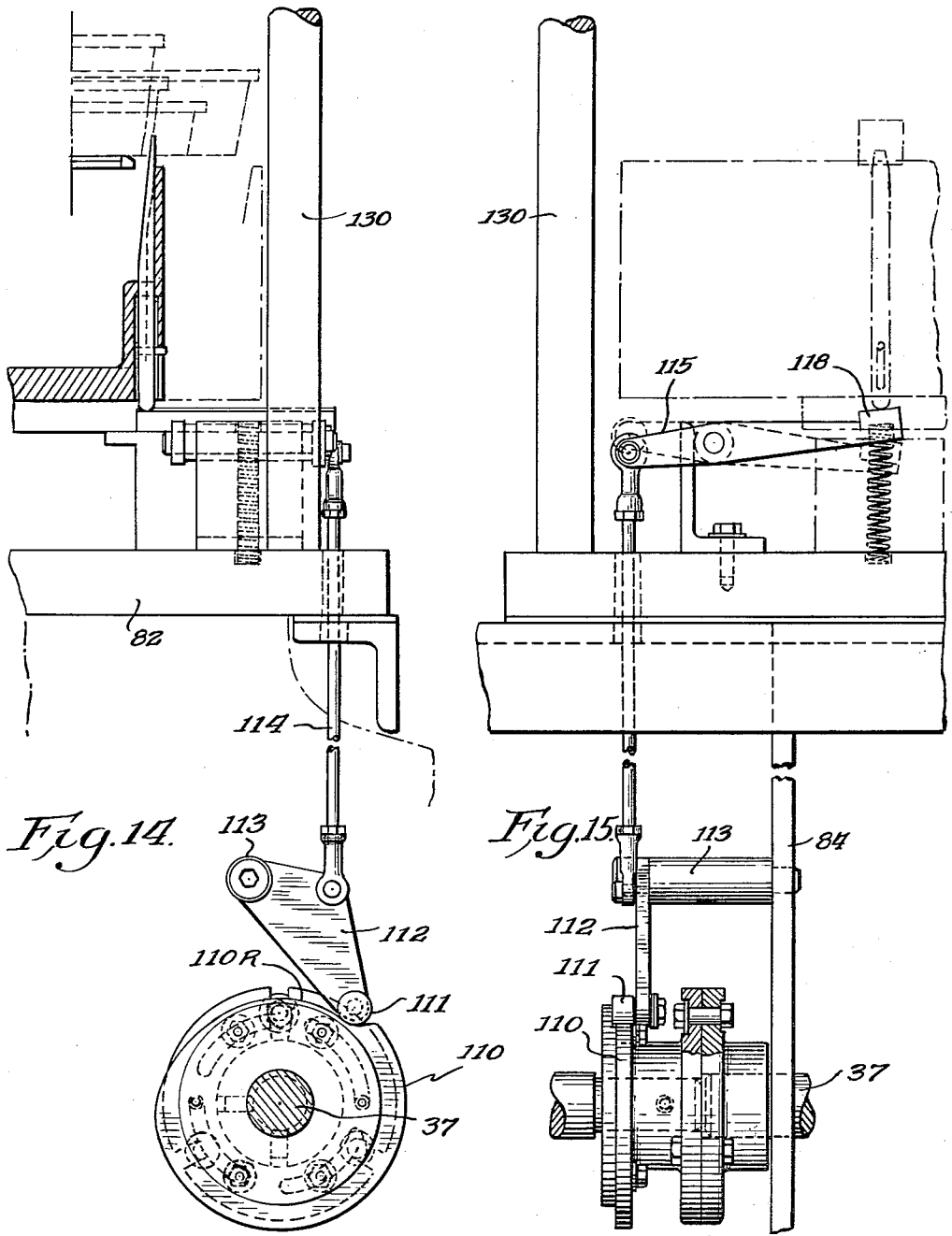

Nov. 20, 1962 G. H. LOGEMANN ET AL 3,064,407
CLOSURE MACHINE FOR FOIL PANS AND THE LIKE
Filed Dec. 24, 1959 15 Sheets-Sheet 11
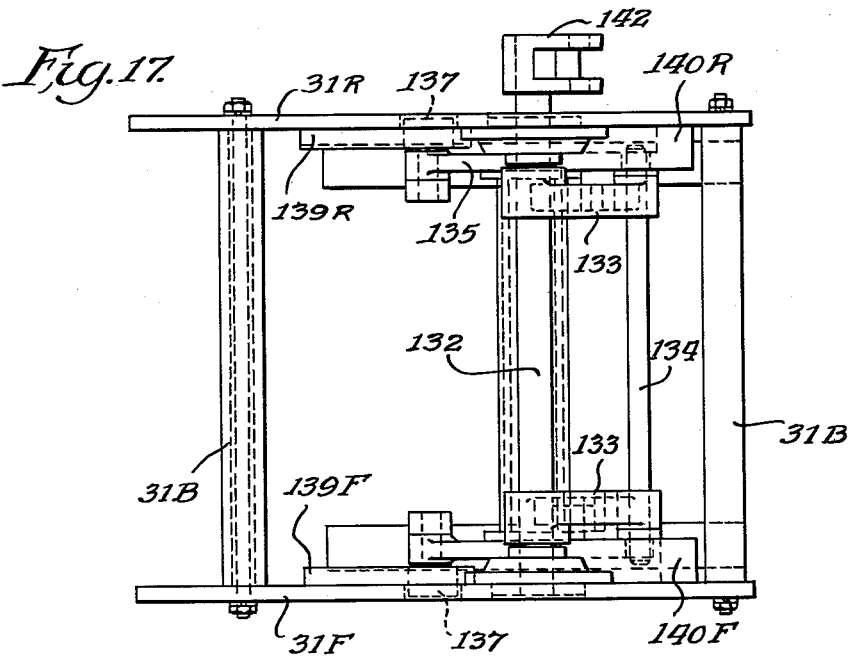
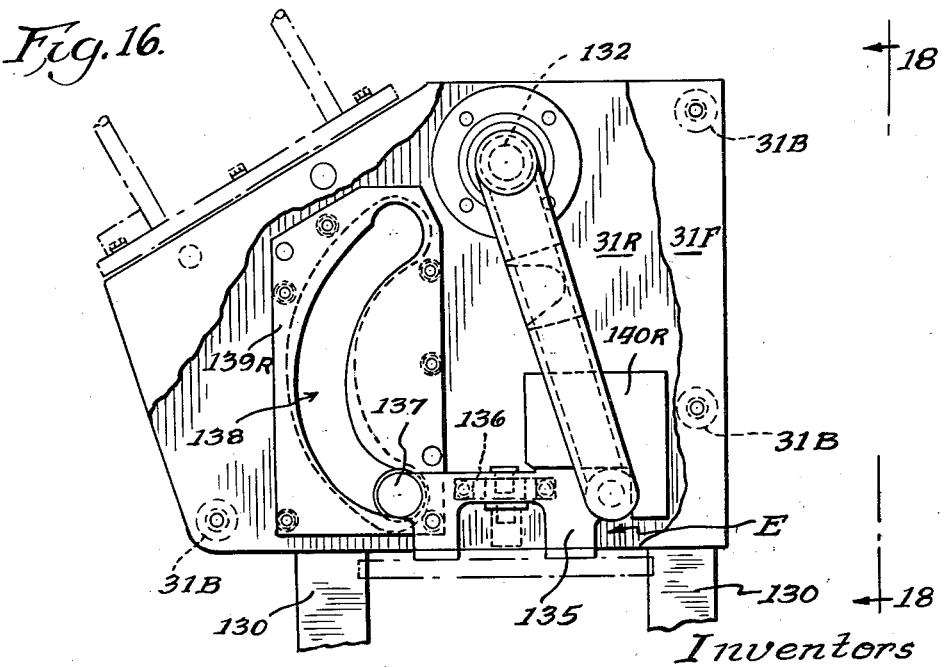
Inventors
George H. Logemann
and John Georgeoff
By Mann, Brown and McWilliams, Attys.

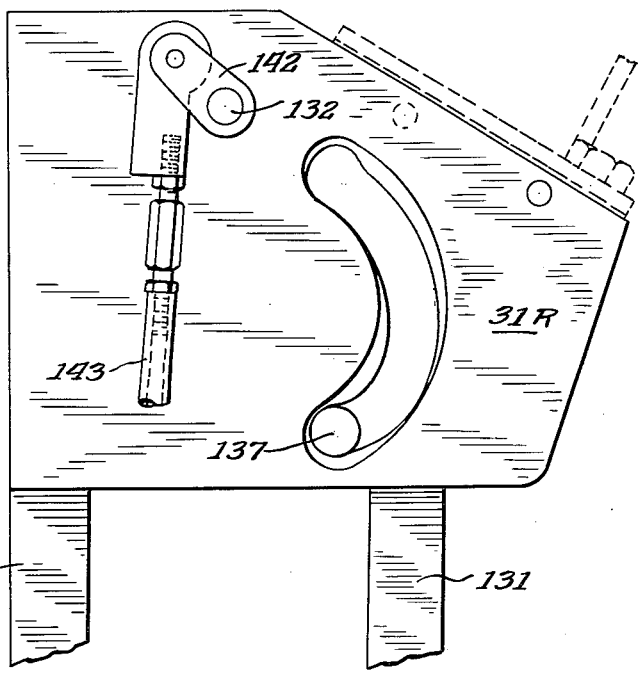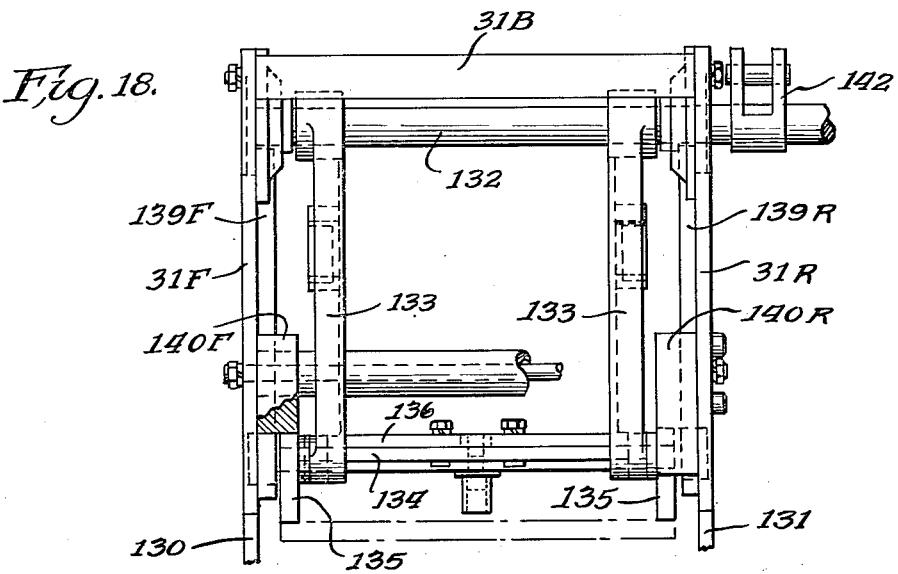

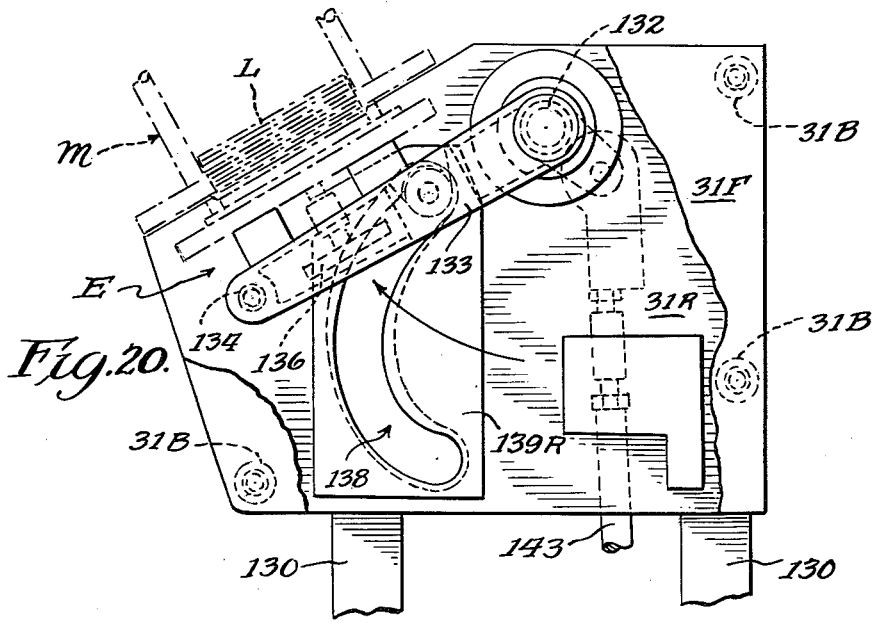
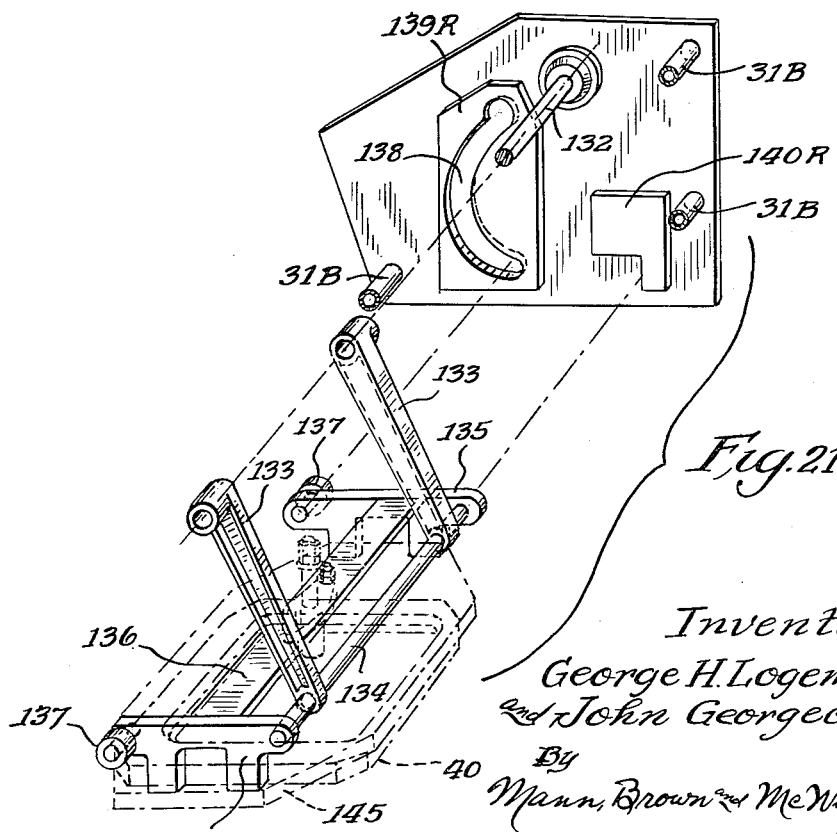

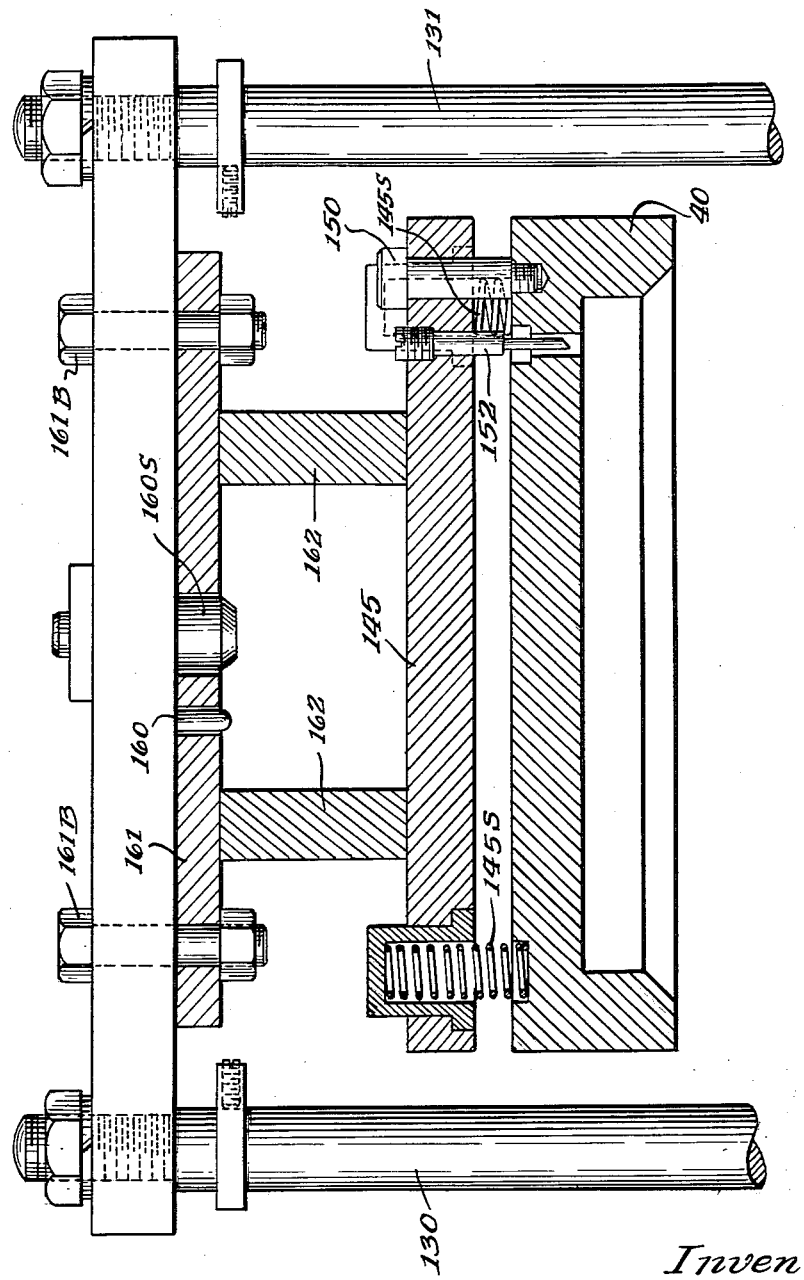

United States Patent Office 3,064,407
Patented Nov. 20, 1962

3,064,407
CLOSURE MACHINE FOR FOIL PANS AND THE LIKE
George H. Legemann, Mundelein, and John Georgeoff, Norridge, Ill., assignors to Ekco Containers, Inc., a corporation of Illinois
Filed Dec. 24, 1959, Ser. No. 861,992
20 Claims. (Cl. 53—307)

This invention relates to a machine for automatically applying closure lids to containers such as foil pans, and has for its principal object the provision of a machine of this nature having facilities for applying and sealing the closure lid to the container in a synchronized sequence of movement.

Among other objects of the present invention are the provision of a closure machine for separately and substantially simultaneously supplying a container and closure lid to a work station where the container and closure lid are gripped between upper and lower dies for fixing and sealing the closure lid on the container, the provision of a closure machine having a short operating cycle for achieving a high production rate, the provision of a closure machine having accurate positioning mechanism for ensuring proper alignment of the container and closure lid, and the provision of a closure machine that is readily convertible to use with containers of various sizes.

In accordance with this invention, separate facilities are provided for intermittently feeding the containers and closure lids into overlying relation at the work station, and these facilities are synchronized with the mechanism for controlling the relative opening and closing movements of the cooperating upper and lower sealing dies.

The containers are fed to the work station by a conveyor mechanism which momentarily deposits each container in accurate position on a support located at the work station.

The closure lids are fed to the work station from the bottom of a lid-stacking magazine by a reversibly operable extractor unit that is swingable in a smooth, continuous motion between a semi-upright position beneath the magazine and an inverted position overlying the container support.

The upper die is swingable with the extractor unit, while the lower die is movable upwardly through the work station to lift the container and the closure lid into engagement between the upper and lower dies.

In the arrangement of this invention, a locating stop is movable through the lower die to project above the container support at the moment that a container arrives thereat for accurate positioning engagement with the container.

A further feature resides in the replaceable mounting of the upper and lower dies, which facilitates ready conversion of the machine to the handling of containers of varying sizes. In addition, the actuating mechanism for the locating stop and for the conveyor are compatible with a range of container sizes.

Other objects and advantages will become apparent during the course of the following description.

In the accompanying drawings forming a part of this specification and in which like numerals are employed to designate like parts throughout the same:

FIG. 2 is a right-hand end elevational view of the closure machine of FIG. 1;

FIG. 3 is an enlarged fragmental front elevational view showing a portion of the closure machine of FIG. 1, with part of the housing again being removed;

FIG. 4 is an enlarged fragmental end elevational view similar to that of FIG. 2 and showing additional features of construction;

FIGS. 5A to 5D are a series of schematic views showing the principal elements of the machine in the successive positions which they assume during a typical operating cycle;

FIG. 5E is a timing chart for the elements shown in FIGS. 5A to 5D;

FIG. 8 is an enlarged vertical front elevational view illustrating the details of the mechanism for raising and lowering the lower die of the machine;

FIG. 8A is an enlarged fragmental sectional view showing the control cam arrangement for positioning the lower die and is taken substantially along the line 8A—8A of FIG. 8;

FIG. 9 is a vertical elevational view of the lower die-positioning mechanism shown in FIG. 8 and including the container stop mechanism associated therewith, with parts of the structure being broken away and sectioned to facilitate disclosure;

FIG. 10 is a detail plan view of part of the mechanism for operating the container stop;

FIG. 11 is an end elevational view of a lower die for use with rectangular containers, a portion of the view being shown in vertical section, the view being taken substantially along the line 11—11 of FIG. 12;

FIG. 12 is a plan view of the lower die of FIG. 11;

FIG. 13 is a vertical sectional view taken substantially along the line 13—13 of FIG. 12;

FIG. 14 is a fragmentary vertical sectional view illustrating the operating mechanism for the container stop that is associated with the lower die;

FIG. 15 is a right end elevational view of the mechanism of FIG. 14;

FIG. 16 is a front elevational view of the capping unit, with part of the housing thereof broken away to facilitate disclosure;

FIG. 17 is a top plan view of the capping unit of FIG. 16, with the closure lid magazine thereof omitted;

FIG. 18 is a right end elevational view of the capping unit of FIG. 16, with parts thereof removed for convenience of disclosure;

FIG. 19 is a rear elevational view of the capping unit of FIG. 16;

FIG. 20 is a front elevational view of the capping unit illustrating the parts thereof in position for extracting a closure lid from its supply mechanism;

FIG. 21 is an exploded fragmentary perspective view of parts of the capping unit;

FIG. 25 is a sectional view of a stationary capping unit for use with the container delivery and elevating mechanism.

General Arrangement and Operation

Figure 1:
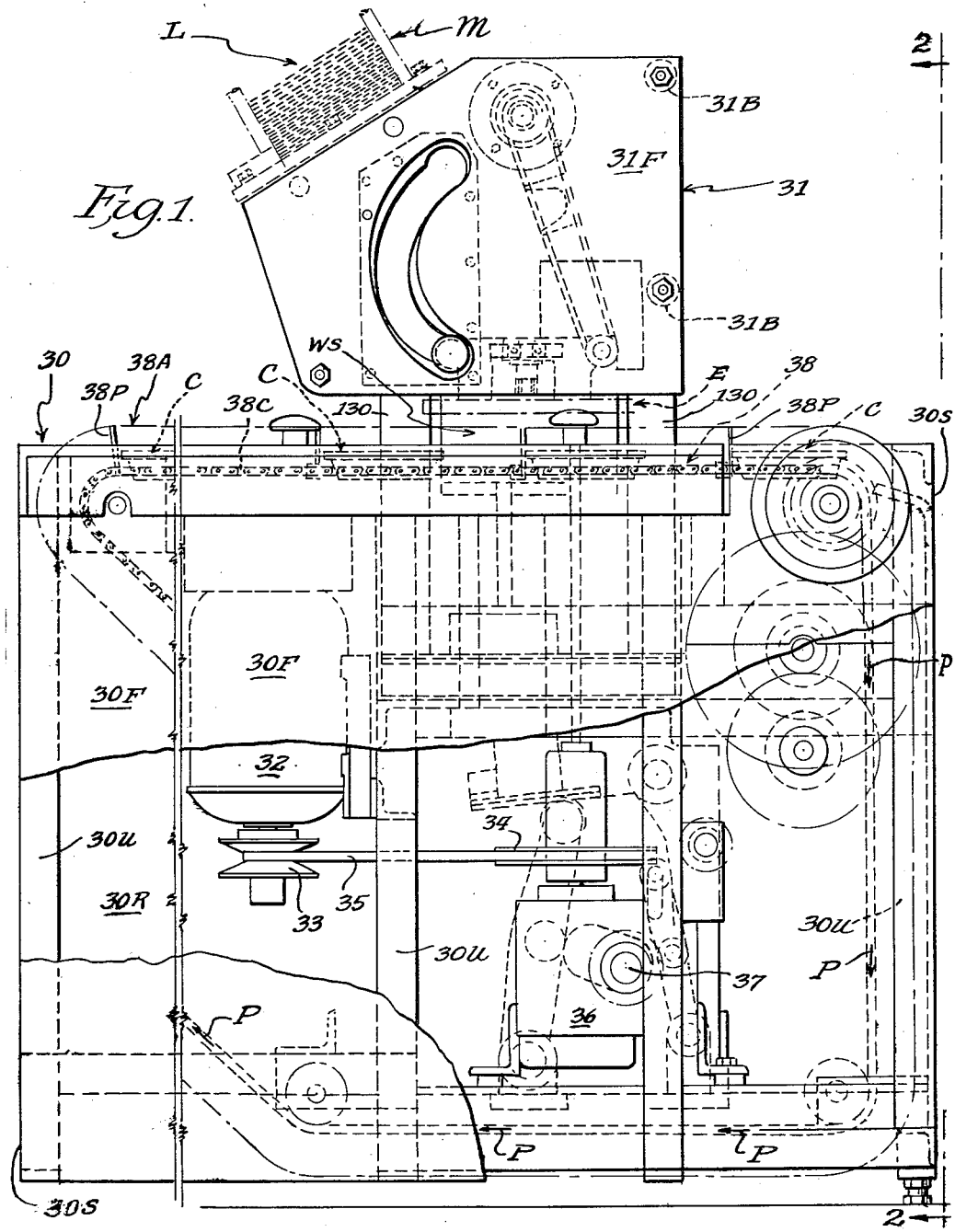
FIG. 1 is a front elevational view of a closure machine embodying the features of this invention, with portions of the housing thereof broken away to facilitate the disclosure.

Referring now to the drawings, the closure machine is shown in its entirety in FIGS. 1 and 2, and it includes a base cabinet designated generally as 30 and having a number of upright framing members 30U which receive front, rear and side sheet metal panels 30F, 30R and 30S, respectively, and a capper unit 31 surmounting the base cabinet approximately centrally of the width and towards the rear thereof and having front and rear panels 31F and 31R, respectively, interconnected by a number of cross bars 31B. The base cabinet 30 houses the drive mechanism for powering and timing the operation of the various mechanisms for handling, assembling and sealing the containers C and their closure lids L.

The drive mechanism includes a motor 32 mounted from the cabinet frame to position its shaft vertically, with the motor having a drive sheave 33 connected to a driven sheave 34 by a belt 35. The driven sheave 34, in turn, is connected to a gear box 36 for rotating the machine's main drive or cam shaft 37.

A conveyor mechanism 38 extends horizontally across the top of the base cabinet and includes spaced apart, sprocket-driven drive chains 38C suitably interconnected at points spaced lengthwise of the travel of the conveyor by pusher bars 38B, each of which carries a pusher plate 38P for advancing a container to the work station S which is located directly beneath the capper unit 31. The conveyor mechanism includes an elongated approach section, a fragment of which is indicated generally at 38A on the left side of FIG. 1, and the containers which are to be capped may be deposited on this approach section by any suitable automatic mechanism (not shown), or manually, as desired. It will be understood that only one container is deposited between adjacent pusher plates 38P. The path of the conveyor chains 38C, as indicated by the arrows P in FIG. 1 and 3, extends vertically downward along the right-hand side panel 30S, then across the bottom of the base cabinet and angularly upwardly towards the upper left-hand corner of the base cabinet, as viewed in FIG. 1.

The closure lids L are stacked in inverted relationship in a magazine M mounted to extend angularly upwardly from adjacent one end of the capper unit 31, and the capper unit includes an extractor mechanism reversibly swingable in a smooth, continuous motion between an inverted, or downwardly facing, position in which it is shown at E in FIG. 1, and a substantially upright position underneath and facing the bottom end of the magazine M. The extractor unit successively feeds closure lids individually to the work station and each closure lid arrives thereat in predetermined timed relation with the containers supplied thereto along the conveyor.

As indicated diagrammatically in FIGS. 5A to 5D, the extractor mechanism E of the capper unit also includes an upright die 40 swingably movable therewith and cooperable with a lower die 41 which is vertically reciprocable through the work station area to elevate a container thereat and carry it upwardly to receive the closure lid and grip the container and closure lid in sealing engagement between the upper and lower dies. The controlled movement of the extractor mechanism ensures accurate positioning of the closure lids, while a separately controlled, momentarily actuated stop 42 cooperates with the pusher plates 38P and side-guide facilities on the conveyor for ensuring accurate location of each container on a stationary support platform 39.

It will be understood that the conveyor mechanism undergoes an intermittent motion characterized by gradual acceleration and gradual deceleration at the beginning and end of each such movement cycle in order to provide smooth travel for the containers, which in some instances are filled with liquids, such as gravy, for preventing spillage. However, the momentum of the container would normally cause it to move free of the pusher plate during the deceleration phase of the movement and the provision of a limiting stop 42 becomes necessary to assure an accurate final location of the container. With this arrangement, the pusher plate 38P, which is of sufficient height to contact the container at the edge of its marginal rim, stops short to afford a slight clearance with respect to the container for accommodating unimpaired vertical movement of the lower die 41.

In instances where the machine is handling a dry product, it may operate at such high speed that the containers rebound upon striking the stop 42. The following action of the pusher plate 38P as it completes its deceleration is effective, in such cases, to trap the container against the possibility of its bouncing out of the die 41.

The timed sequence of container and closure lid supply to the work station and of die movement at the work station and the ancillary function of the stop 42 and the vacuum-operated extractor mechanism E is best understood by reference to the sequence of diagrammatic views shown in FIGS. 5A to 5D taken in conjunction with the machine's timing chart, shown in FIG. 5E. As indicated in FIG. 5A, the right-hand container C has been capped and is being removed by the conveyor mechanism, while the left-hand container C is now advancing towards the work station for deposit on the support platform 39. At this time the lower die 41 is down and the stop 42 is retracted within it, while the extractor mechanism and upper die 40 have been swung into semi-upright position adjacent and engaging the bottommost closure lid L in the lid-supply magazine M. FIG. 5A corresponds approximately to the 90° line of the cam shaft timing chart of FIG. 5E.

As indicated in FIG. 5B, the stop 42 is extended through the lower die 41 to project above the support table and engage and accurately position the container arriving on the support platform 39. During this time, the extractor mechanism E, with a cover lid L in place thereon, and the upper die 40, are returning to their normal inverted position above the platform 39. Thus FIG. 5B corresponds to the 180° line of the cam shaft timing chart of FIG. 5E and it also illustrates the approximate relationship between the pusher plates 38P of the conveyor mechanism and a container in position on the support platform 39. The characteristic deceleration of the pusher plate allows the container to move free, and the plate is stopped short to provide the illustrated clearance for accommodating free movement of the lower die 41 while still preventing the possibility of a container rebounding from stop 42 and escaping the die 41.

FIG. 5C corresponds approximately to the 240° line of the cam shaft timing chart and shows that the extractor unit has returned to and remains at its normal inverted position and holds the cover lid while the lower die is moving upwardly into rim engagement with the container for elevating it above the plate 39.

Finally, FIG. 5D shows the container, with its cover lid in place, gripped between the upper and lower dies for sealing the cover lid to the container. The vacuum grip of the extractor mechanism on the cover lid is released immediately before the dies engage. Thereafter, the lower die drops down to deposit the sealed container on the support table 39; and during this motion the extractor unit swings upwardly towards the position in which it is shown in FIG. 5A, while the conveyor carries away the sealed container and introduces another open container.

Conveyor Arrangement and Operation

The conveyor mechanism is controlled by a Geneva movement powered from the drive shaft 37, which, as best shown in FIGS. 3 and 4, carries a sprocket 51 connected by a link chain 52 which is engaged intermediately with a sprocket 53 and at its other end is trained over a sprocket 54 mounted on a driven shaft 55 that mounts the continuously rotating wheel 56 of the Geneva movement. The Geneva wheel 57 is journalled on a shaft 58 and is provided with four equally spaced, radially extending, open-ended slots 57S which cooperate with drive pins 56P carried in correspondingly spaced relation on the continuously rotating wheel 56.

As is best seen in FIG. 3, the Geneva wheel 57 is driven one quarter of a revolution each time that a drive pin 56P comes by, and this produces the characteristic intermittent advance of the Geneva movement.

The shaft 58 for the intermittently driven Geneva wheel 57 also carries a large gear wheel 59 which meshes with and drives a pinion gear 60 on the conveyor drive shaft 61. The conveyor drive shaft 61 carries sprockets 62 (see FIG. 4) around which the conveyor chains 38C are trained. A number of idler sprockets 63 are spaced about the base cabinet for guiding the return flight of the conveyor chains. Along their upper flight, these conveyor chains 38C, together with their cross bars 38B and pusher plates 38P, move across a slide plate 64 on which the containers are supported and guided during their advance to the support platform 39 of the work station and beyond. The slide plate is interrupted intermediately along its length to accommodate the support platform.

Figure 6:
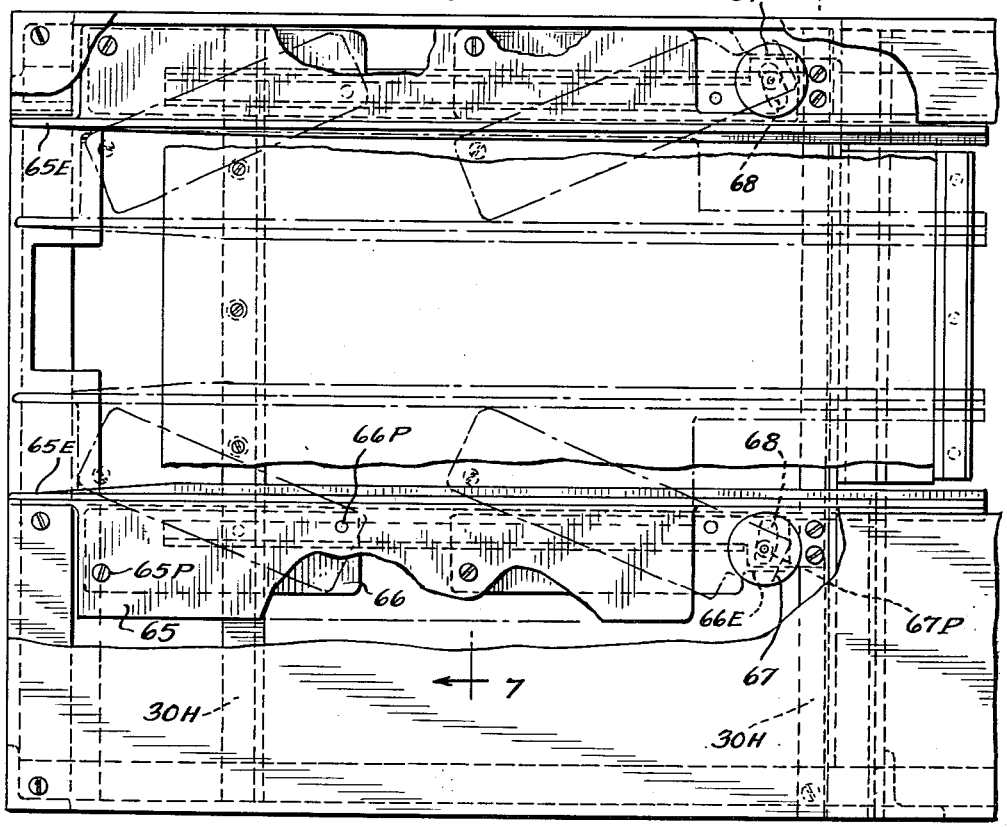
FIG. 6 is an enlarged fragmentary plan view of the portion of the conveyor mechanism adjacent the central work station where the closure lids are applied and sealed to the containers, the view being taken on the line 6—6 of FIG. 4.
Figure 7:
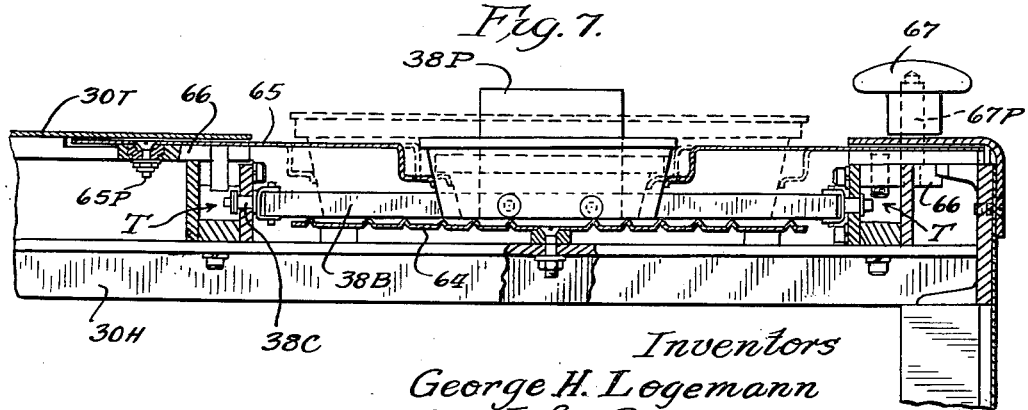
FIG. 7 is a transverse sectional view of the conveyor section of FIG. 6 and is taken substantially along the line 7—7 of FIG. 6.

As is best seen in FIG. 7, throughout substantially the entire horizontal movement of the upper flight of the conveyor chains, they are constrained to slide along horizontal trackways T mounted on transversely extending horizontal angle-iron framing members 30H of the base cabinet. Cooperating container-guide plates 65 having tapered, slightly converging entering ends 65E (see FIG. 6) are arranged above the sections of the flight chains extending along the support platform, and they cooperate with the stop member 42 and the pusher plates 38P of the conveyor for ensuring accurate location of the arriving containers on the support plate. The guide plates 65 overlie positioner bars 66 which are mounted to the machine frame by means of pivot pins 66P and are connected to the plates 65 by pivot pins 65P. The positioner bars 66 adjacent the right-hand side of FIG. 6 have end extensions 66E connected to positioner knobs 67 through pins 67P which are movable in slots 68.

When the guide plates 65 are spaced apart to a maximum extent, as shown in full lines, the positioner bars 66 extend parallel over the trackways T, and by manipulation of the positioner knobs 67 the bars may be pivoted to an inwardly extending angular position for shifting the guide plates inwardly as suggested by the phantom-line illustrations thereof for handling and guiding smaller sized containers. In the illustrated construction, as best seen in FIG. 7, the trackways T, positioner bars 66, and guide plates 65 are preferably masked by top panel sections 30T of the base cabinet.

As best shown in FIGS. 3 and 4, the connection from the Geneva movement to the conveyor chains may also be adjusted to correlate the stop position of each pusher plate 38P with respect to the work station. Such adjustment is necessary to ensure appropriately accurate positioning for the various size containers the machine is to handle. The pinion gear 60 is connected through coupler sleeves 60A and 60B which are journalled loose on the conveyor drive shaft 61. Coupler sleeve 60B is in turn connected to a drive wheel 61W which is keyed to the left end of shaft 61 to transmit motion from the pinion 60 to the drive shaft.

To provide adjustment of the conveyor position for handling containers of different size, the drive wheel 61W and coupling sleeve 60B are each provided with a spiralling ring of holes H (see FIG. 3), corresponding ones of which register to receive a connector pin or screw 61P for determining each of the various container-delivery positions of the conveyor mechanism.

The adjustable container guide plates 65 cooperate with the adjustable drive connection for the conveyor chains to completely and accurately define the desired delivery position for each container delivered to the work station.

*Lower Die and Container Stop Mechanisms*

The lower die 41 is of a hollow, pot-shaped construction and, as indicated adjacent the top of FIGS. 8 and 9, it has the stationary support platform 39 located within it on a plurality of stationary vertical support posts 80 which are best shown in FIGS. 11, 12 and 13. The support posts 80 are fixed in and extend upwardly from a guide shell 81 that is carried on a horizontal framing plate 82 located centrally within the base cabinet 30. The framing plate 82 is mounted to a horizontal header 83 which is bridged across the upper ends of a pair of internal support walls 84 which provide support for the various shafts that comprise the control mechanisms for the lower die 41 and the stop 42.

In the related views of FIGS. 8 and 9, the lower die 41 is shown in its uppermost or container-sealing position corresponding to that of FIG. 5D, while the stop 42, which is contained in and vertically reciprocable through the surrounding wall of the lower die, is illustrated in retracted position within the lower die. The lower die is fixed to a mounting plate 85 secured to the upper ends of a pair of posts 86 and 87, which are slideable vertically through the stationary guide shell 81 and which, at their lower ends, project beneath the main framing plate 82 for connection to a yoke which is comprised of spaced apart parallel side pieces 88 (see FIGS. 8 and 9) each of which has a depending ear 88E apertured to cooperably receive a mounting pin 89 for a roller 90 that is disposed between these ears.

A connector 91 of H-shaped cross-sectional configuration (see FIG. 9) has horizontally elongated slots 91S along its upper walls. The side pieces 88 and roller 90 are received between the upper walls of the connector casting, with the connector casting 91 being positively engaged to the side pieces 88 and hence to the vertically movable posts by engagement of opposite ends of the mounting pin 89 within its slots 91S.

The connector casting 91 is mounted to the horizontal arm 92 of a crank arm structure which pivots about the axis of shaft 93 and which includes a depending vertical arm 94 terminating in an open-sided cage defined by spaced side plates 94S and a rear roller plate 94R.

During both its upward and downward movements, the lower die 41 is driven by positive connection to the crank arm structure. The position of the connector casting 91 along crank arm 92 is adjustable by the threaded rod 92T to provide a precision adjustment of die movement for accurately regulating the impact of the dies. Harder die impact results from adjustment of the connector towards the right, as viewed in FIG. 8.

Upward die movement is controlled by cam 96 on the main drive or cam shaft 37, while downward die movement is controlled by cam 97 on the same shaft. Cam 96 works against a cam roller 98 carried intermediately between upwardly extending parallel lever arms 99 which are swingable about a pivot shaft 100 journalled in the machine framing and which jointly carry a roller 101 at their upper ends for wheeled engagement with the horizontal arm 92 of the crank arm structure.

Cam 97 works against a cam roller 103 carried intermediately between upwardly extending parallel lever arms 104, the bottom ends of which are pivoted about a shaft 105 journalled to the machine framing and the upper ends of which carry a roller 106 disposed within the open-sided cage in wheeled engagement with the roller plate 94R carried by the vertical crank arm.

Assuming the main drive shaft 37 is rotating clockwise, as viewed in FIG. 8, it will be apparent from the position of cam 96 that the lower die 41 is approximately in its uppermost or container-sealing position, and this corresponds approximately to the 264° line on FIG. 5E. Upon continued rotation of the drive shaft, cam 97 gradually comes into play to drive roller 106 against roller plate 94R on crank arm 94 and pivot the crank arm structure counterclockwise, as viewed in FIG. 8, to forcibly retract the lower die 41. During this action, the cam 96 has rotated sufficiently to permit roller 101 and its lever arms 99 to follow the downward swinging movement of crank arm 92 occasioned by the positive driving action of roller 106. During a dwell period wherein the lower die is at its lowermost position, the sealed container is removed and another open container is deposited on plate 39. Then the high point on the cam 96 swings around to drive roller 101 in a direction to elevate the die 41.

The stop member 42 is controlled by a positioning mechanism which, as best shown in FIGS. 9, 14 and 15, is also driven by the main drive shaft 37 through a cam 110 mounted on the drive shaft and cooperating with a cam roller 111 carried on a bell crank 112 which is pivoted on a shaft 113 projecting from the side plate 84, with the bell crank being connected to reciprocate an intermediate vertical rod 114 which extends upwardly through the main horizontal framing plate 82 for connection to a cradle structure 115 (see FIGS. 9 and 10), which is rotatably journalled in a horizontal sleeve 116 welded along the upper extremity of an angle iron bracket 117 on the main plate 82. The cradle structure includes an elongated contact arm 118 having a recess 118R intermediately along its underneath side forming a seat for a biasing spring 119 which reacts against the plate 82. The stop-positioning mechanism normally holds the bias spring under substantial compression during the time that stop 42 is inactive.

Reference to the timing chart of FIG. 5E shows that the stop 42 is elevated immediately prior to elevation of the lower die 41, and this stop performs its locating function during the time when the die is in its lowermost position. Furthermore, the positioning mechanism for the stop is effective substantially only when the lower die 41 is in its lowermost position.

As best shown in FIG. 13, the stop 42 is captive within the die 41. It is shown in full lines in its normal retracted position within the lower die and it is shown in dotted lines in its position of maximum extension above the lower die. In the illustrated construction, the stop carries an abutment pin 42P which is operable within a slot 41S in the side wall of the lower die to limit the movement of the stop with respect to the die to a prescribed range. A bias spring 42S reacts against the pin 42P to bias the stop 42 to its illustrated full-line retracted position.

When the lower die is in its lowermost position, the stop 42 is under the control of its positioning mechanism. During each rotation of the drive shaft, as the cam roller 111 drops into the relieved surface 110R of the cam 110 (see FIG. 14), the rod 114 moves downwardly to rock the cradle structure and correspondingly raise the stop contact arm 118. Spring 119, which has been held under compression, expands to assist this movement and provide a fast, reliable elevation of the stop 42. Shortly after this action occurs, the lower die 41 begins to move upwardly to pick up the container which has just been located by the stop and the stop mechanism is then inactive until the corresponding point in the next cycle of drive shaft rotation. In FIG. 9, the stop-positioning mechanism is shown in its inactive position while in FIGS. 14 and 15, the stop-positioning mechanism is shown, in full lines, in its active position.

Once again it may be noted that the construction of the closure apparatus of this invention, in order to provide simplified conversion thereof for handling containers having a range of sizes, has provision for releasably securing the lower die to its mounting plate 85. The stop-positioning mechanism does not require adjustment. Assuming a different size container is to be handled, a lower die of corresponding size is substituted, and it will be understood that each lower die structure has its own stop element 42. Due to the length of the contact arm 118, this same contact arm will work with the larger size die, and this principle is indicated by the phantom-line illustrations in FIG. 14.

Capping Unit

The capping unit 31 is supported above the work station on a pair of front posts 130 and a pair of rear posts 131 which extend upwardly from adjacent the front and rear corners, respectively, of the main framing plate 82. The posts 130 are connected to the front panel 31F of the capping unit adjacent opposite ends thereof while the rear posts 131 are connected to the rear panel 31R adjacent opposite ends thereof.

FIG. 16 is a front elevational view of the capping unit with its front panel 31F partially broken away, illustrating the extractor mechanism E in its normal inverted position above the work station, while FIG. 20 is a corresponding view illustrating the extractor mechanism in its semiupright position adjacent and engaging the bottommost closure lid L in the lid-supply magazine or hopper M. For completeness, additional views of the capping unit are included. FIGS. 17, 18 and 19 are plan, right-end elevational, and rear elevational views, respectively, while FIG. 21 is a fragmentary exploded perspective view better illustrating the construction.

A main rock shaft 132 extends between the front and rear panels 30F and 30R and rotatably supports a pair of rocker arms 133, the lower ends of which receive a pivot shaft 134, the opposite ends of which are anchored in parallel extending side yokes 135 that are interconnected by a central bridge 136 to complete the movable extractor carriage of the capping unit. The side yokes 135 support outboard guide rollers 137 at corresponding ends thereof and in spaced relation from the pivot shaft 134.

The rollers 137 operate in guideways 138 provided on the front and rear panels 30F and 30R, with each of the front and rear panels preferably having a hardened steel plate 139F and 139R, respectively, mounted on its inside face and accurately cut out to define the guideways 138. The front and rear panels are each provided with stop plates 140F and 140R, respectively, which are engageable with the yokes 135 to stop the carriage as it swings downwardly towards it normal inverted positon.

It will now be apparent that the carriage of the capper unit undergoes a reversible swinging movement between its normal inverted position of FIG. 16 and its semi-upright position of FIG. 20, with the position of the carriage at opposite ends of its travel being determined by the guideways 138 in conjunction with the rock and pivot shafts 132 and 134.

The carriage and its pivot linkage are desirably low in weight and the linkage arrangement provides a factor of angle multiplication such that a pivot angle of approximately 75° of the rock shaft is translated into approximately 130° of carriage rotation in moving between its pickup and release positions. The carriage is driven in a smooth and continuous motion characterized by a slight angular or peeling movement as it draws away from the hopper. This peeling movement allows the lids to be withdrawn without requiring the added motion step of first backing directly away from the hopper. The low weight and multiplied angular movement of the carriage importantly contribute to a high-speed closure machine. In addition, the capper unit is of minimum size since the carriage swing is controlled by the shape of the guideways which act on the carriage rollers in combination with the pivot suspension at the opposite side of the carriage.

As best seen in FIGS. 17–20, the operating mechanism for rocking the carriage between its opposite limit positions includes a crank arm 142 fixed to a rear end projection of the rock shaft 132 and pivotally connected to a vertically reciprocable operator rod 143. As shown in FIGS. 2 and 4, the operator rod 143 is controlled by a cam 144 mounted on a rear end extension 37R of the main cam shaft of the base cabinet. The time sequence of the cam for driving the operating arm 143 is again shown in FIG. 5E.

Figure 22:
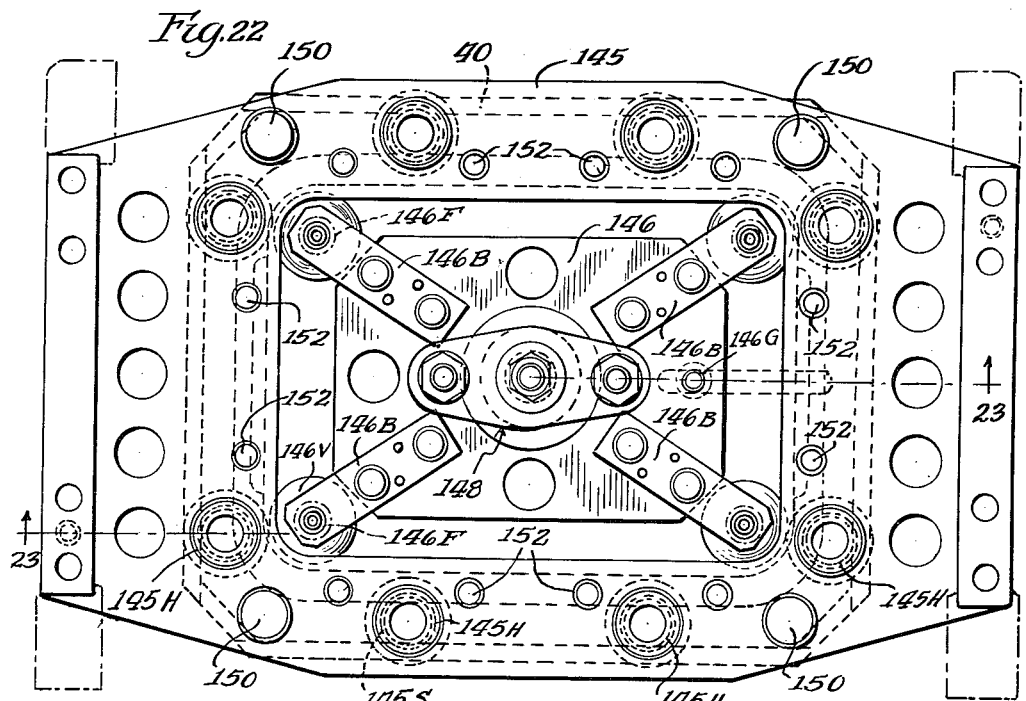
FIG. 22 is a plan view of the upper die and extractor mechanism of the capping unit.

The carriage of the capper unit comprised of the side yokes 135 and central bridge 136 carries an upper die-mounting frame 145 (see FIG. 21), the opposite ends of which are fixed to the lower ends of the yoke pieces 135, while a vacuum cup mounting plate 146 (see FIGS. 22, 23 and 24) is suspended from the bridge 136 by means of a shouldered column 147 which extends through a sleeve bearing assembly designated generally as 148 carried by the bridge.

Figure 23:
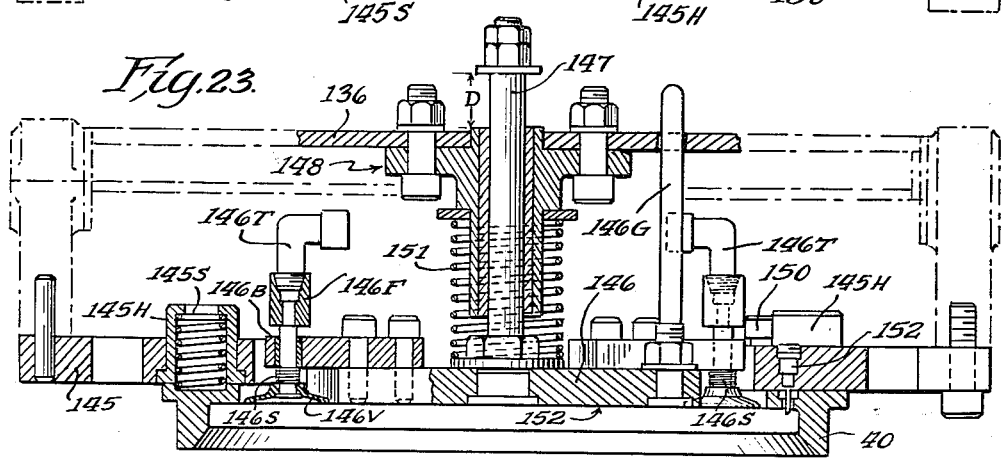
FIG. 23 is a vertical sectional view taken substantially along the line 23—23 of FIG. 22.

The vacuum cup mounting plate 146 is located centrally within the mounting frame 145 and is movable therethrough a distance D indicated in FIG. 23 between the upper end of the shouldered column 147 and the sleeve bearing 148. The angular position of the vacuum cup mounting plate 146 with respect to the frame 145 is stabilized by an upstanding guide rod 146G which projects through the bridge 136. The vacuum cup mounting plate 146 carries corner brackets 146B, the outer ends of which are apertured to receive vacuum cups 146V, the stems of which are slideable through the brackets and terminate in shouldered connection fittings 146F for the flexible tubing 146T. Bias springs 146S are provided between the vacuum cups 146V and their support brackets 146B to normally urge the vacuum cups downwardly until the shouldered fittings 146F abut the brackets 146B (see FIG. 24). This spring-loaded vacuum cup arrangement accommodates as much as a ¼" warp on the cover lind without impairment of the cover pickup operation.

Figure 24:
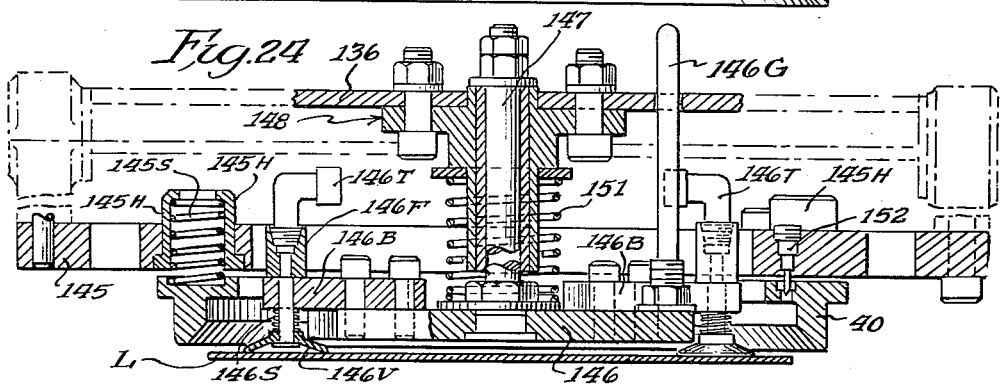
FIG. 24 is a sectional view corresponding generally to that of FIG. 23 and illustrating the normal position of the upper die and extractor mechanism.

The upper die 40 is suspended from the frame 145 by a plurality of shouldered mounting pins 150 which limit movement of the die relative to its mounting frame. The mounting frame includes a plurality of inverted cup-shaped housings 145H having bias springs 145S seating against the die to normally urge it downwardly from the mounting frame to the position in which the parts are illustrated in FIG. 24. It will also be noted that a spring 151 reacts between the sleeve bearing assembly 148 and the vacuum cup mounting plate 146 to urge this plate outwardly through the die 40. Plate 146, acting under the force of the spring 151, acts to eject the container and closure lid from the top die 40 into the lower die 41 during parting movement of the dies. Similarly, the vacuum cups are projected to their full extent beneath the mounting plate.

It will be apparent from a consideration of FIG. 24 that a cover lid is normally contacted only by the vacuum cups which project beyond the die 40 and that when the lower die 41 brings the container upwardly to receive and seal against the closure lid, the vacuum cups 146V yieldably retract to permit the upper die to engage against the closure lid L. As the lower die continues its upward movement, the vacuum cup mounting plate 146 will also retract as required and finally the upper die 40 will retract as the closing pressures increase. It will be understood that the vacuum cups must release their suction grip upon the lid immediately prior to the lower die reaching its uppermost point of travel, as indicated in the timing chart of FIG. 5E. The flexible tubes which apply suction through the vacuum cups are controlled by a valve (not shown) that has a timing cam (not shown) associated with the main drive or cam shaft 37. Finally, the upper die 40 has a plurality of lancing punches 152 projecting through its flat inner face and operable during the final closure of the dies to pierce the bent-over vertical container flange and the closure lid and form a secure mechanical interlock at spaced points about the container. The bias springs which seat against the upper die 40 are strong enough to allow full die closure to take place before the lances 152 are operative and then to strip the container and closure lid from the lancing punches.

*Summary*

The closure machine of this invention provides a synchronized movement of containers and closure lids to a central work station wherein the lids are applied individually to the containers and are sealed with the same motion. The capper unit mechanism for delivering the lids includes the upper closure die which is movable with a reversibly swingable extractor carriage. High-speed carriage movement within a small chamber is achieved by a unique mechanical movement having a characteristic smooth and continuous motion.

The containers are successively delivered by an intermittently operable conveyor mechanism 38 which deposits containers individually in accurate location on the support platform 39. This container support platform is recessed within the pot-shaped lower die 41, and this arrangement permits upward movement of the lower die to elevate the container into engagement with the upper die and the closure lid carried in association therewith. The lower die has a container stop slideably incorporated in it and this stop is momentarily elevated above the container platform to determine the position of the container. The conveyor mechanism has adjustable facilities for adapting it to containers of other sizes, and the upper and lower dies are exchangeable conveniently to complete the conversion of the machine with but a minimum of time and extra part requirements.

The mode of operation of the machine is characterized by its high speed resulting from the fact that the cover lid application and sealing is accomplished by an integrated sequence of operations carried out at a single work station. This equipment is particularly advantageous since it applies and simultaneously seals the closure lid across the container, and therefore problems of spillage and contamination are minimized. In addition, perfect registry of the closure lids is ensured. The control mechanisms for each of the operations comprising the closure and sealing cycle are all controlled and actuated from cams carried on the drive shaft 37.

*Alternate Closure Unit*

To illustrate that the mechanism of the base cabinet has utility independent of the specific capping unit, an alternate capping unit for use with the conveyor and lower die mechanisms is shown in FIG. 25 wherein the front and rear support posts 130 and 131 are illustrated for purposes of orientation. With this arrangement, the support posts carry a header plate 160 having a depending locating stud 160S and anti-rotation pin 160P for registry with corresponding openings in a locating plate 161 that is secured along the underneath face of the header plate by a plurality of bolts 161B. A die-mounting plate 145 is rigidly connected beneath the locating plate 161, with spacer bars 162 of appropriate size interposed therebetween and establishing the connection. The die-mounting plate 145 supports an upper die 40 of a construction corresponding with that of the upper die of the preferred embodiment, and once again the upper die is suspended from its mounting plate by a plurality of shouldered mounting pins 150 to accommodate limited die movement, with the die normally being biased downwardly by the springs 145S. The upper die mechanism is again shown as including the lancing punches 152.

With this construction wherein the upper die is essentially stationary except for limited yieldably resisted vertical movement during closure, it is contemplated that the closure lids would be applied either manually or automatically while the containers are on the approach section of the conveyor. Thus the containers are deposited on the support platform with the closure lid already in place and the upper die then carries the container and its closure lid into mating, sealing engagement with the upper die.

The foregoing description and the drawings are given merely to explain and illustrate the invention and the manner in which it may be performed, and the invention is not to be limited thereto except insofar as the appended claims are so limited since those skilled in the art who have this disclosure before them will be able to make modifications and variations therein without departing from the scope and spirit of the invention.

We claim:

1. A covering and sealing machine for automatically applying closure lids to containers of the type having an external marginal rim, said machine comprising a container support, intermittently operable means for successively and individually depositing containers at a predetermined position on said support, a lower die normally positioned beneath the rim of the container on said support, intermittently operable movable means having an upper die incorporated therein and movable therewith between a lid pickup position and a capping position for successively and individually supplying and supporting a closure lid at the capping position overlying the container on said support, with said upper die overlying said closure lid at said capping position, and means for momentarily shifting the lower die upwardly to engage and lift the container to bring the container rim and closure lid into sealing engagement between said dies.

2. A covering and sealing machine for automatically applying closure lids to containers of the type having an external marginal rim, said machine comprising a closure station having a container support, intermittently operable conveyor means for advancing containers successively across said support and including means for momentarily depositing each container at a predetermined position on said support, a lower die normally positioned to engage beneath the rim of a container at said predetermined position on said support, intermittently operable means for sucessively supplying and supporting a closure lid to a release position overlying the container on said support and including a hopper for receiving a stack of closure lids and discharging the bottommost lid at a point spaced above said support, an extractor mechanism swingable between said release position and a feed position wherein it engages and draws down said bottommost lid, and an upper die swingably movable with said extractor mechanism and mounted above the closure lid when the parts are in said release position, and means for shifting the lower die upwardly to engage and lift the container from said support to bring the container rim and closure lid into sealing engagement between said dies.

3. A covering and sealing machine for automatically applying closure lids to containers, said machine comprising a container support, intermittently operable conveyor means for successively and individually depositing containers at a predetermined position on said support, a lower die positioned in telescoping relation around said support for engagement with a container at said predetermined position on said support, capping means including means for supplying closure lids to a feed position, a carriage reversibly swingable between said feed position and a release position located above the container on said support, an extractor mechanism mounted for swinging movement with said carriage and operable at said feed position to receive a closure lid for supply to said release position, and an upper die mounted for swinging movement with said carriage and surrounding said extractor mechanism, and means for shifting the lower die upwardly to engage and lift a container from its position on said support to said release position at the time a closure lid is present thereat to bring the container and closure lid into sealing engagement between said dies.

4. A covering and sealing machine for automatically applying closure lids to containers, said machine comprising a container support, intermittently operable conveyor means for successively and individually depositing containers at a predetermined position on said support, a lower die positioned in telescoping relation around said support for engagement with a container at said predetermined position on said support, capping means including means for supplying closure lids to a feed position, an extractor mechanism operable when at said feed position to receive a closure lid and operable when at a release position located above the container on said support to release such closure lid, an upper die surrounding said extractor mechanism to engage a closure lid carried thereby, and means for reversibly swinging said extractor mechanism and said upper die in unison between said feed and release positions, and means for shifting the lower die upwardly to engage and lift a container from its position on said support to said release position at the time a closure lid is present thereat to bring the container and closure lid into sealing engagement between said dies.

5. A covering and sealing machine for applying closure lids to containers and comprising a container support, means for intermittently and momentarily depositing a container at a predetermined position on said support, a lower die normally positioned beneath the container on said support, a hopper for receiving a stack of said closure lids, movable means having an upper die incorporated therein and movable therewith between a lid pickup position and a capping position for intermittently feeding and momentarily holding a lid in the capping position overlying the container on said support, with said upper die overlying said closure lid at said capping position, and means for momentarily shifting the lower die upwardly to engage and lift the container to bring the container rim and closure lid into sealing engagement between said dies.

6. A machine for applying closure lids to containers and comprising a container support, cyclically operable means for momentarily depositing a container at a predetermined position on said support, a lower die beneath the container on said support, cyclically operable movable means having an upper die incorporated therein and movable therewith between a lid pickup position and a capping position for feeding and momentarily holding a closure lid in the capping position overlying the container on said support, with said upper die overlying and engageable with a closure lid in said capping position, cyclically operable means for momentarily shifting the lower die upwardly of said support to bring the container and closure lid together between said dies, and cyclically operable drive means connected to drive each of said cyclically operable means once and in predetermined timed relationship during each operating cycle of the machine.

7. A machine for applying closure lids to containers and comprising a container support, cyclically operable means for momentarily depositing a container at a predetermined position on said support, a lower die beneath the container on said support, capping means including means for supplying closure lids to a feed position, cyclically operable means operable when at said feed position to receive a closure lid and operable when at a release position above the container on said support to release such closure lid, an upper die surrounding said last-named means to engage a closure lid carried thereby, and cyclically operable means for moving the said last-named means and said upper die jointly from said release position to said feed position and back to said release position, cyclically operable means for momentarily shifting the lower die upwardly of said support to bring the container and closure lid together between said dies, and cyclically operable drive means connected to drive each of said cyclically operable means once and in predetermined timed relationship during each operating cycle of the machine.

8. A machine for applying closure lids to containers and comprising a container support, cyclically operable conveyor means for momentarily depositing a container at a predetermined position on said support, a lower die in telescoping relation around said support and shiftable vertically relative thereto, cyclically operable stop means momentarily shiftable above said lower die and said container support at a point adjacent said support and on the side thereof towards which the container moves as it is deposited by said conveyor means, cyclically operable means for feeding and momentarily holding a closure lid in position overlying the container on said support, an upper die overlying and engageable with the closure lid overlying said support, cyclically operable means for momentarily shifting the lower die upwardly of said support to bring the container and closure lid together between said dies, and cyclically operable drive means connected to drive each of said cyclically operable means once and in predetermined timed relationship during each operating cycle of the machine.

9. In a machine for automatically applying closure lids to containers, said machine including upper and lower dies that undergo relative closing movement to grip said container and closure lid in cooperating sealing engagement therebetween, a container support between said dies, a container-engaging stop means movably mounted on said lower die at a position beneath said support, intermittently operable means for momentarily elevating said stop means above said support, intermittently operable means for depositing a container on said support in locating engagement with said stop means at the elevated position thereof, and intermittently operable means for supplying and supporting a closure lid at a position directly overlying the container on said support.

10. In a closure machine for applying closure lids to containers, a work station having a support table for the containers, and an intermittently operable conveyor having a series of pusher bars movable along a feed table for successively and individually engaging and advancing containers towards a predetermined position on said support table, a lower die positioned in telescoping relation around said support table for upward movement to engage a container at said predetermined position on said support table, stop means slidably mounted in said lower die to project above said support table on the side thereof remote from the direction of approach of said containers, intermittently operable means for momentarily elevating said stop means above said support table to engage a container arriving thereat, intermittently operable means for supplying and supporting a closure lid at a position directly overlying the container on said support table, and intermittently operable means for momentarily lifting the die upwardly to lift the container on said support table up to said closure lid.

11. A capping unit for handling and applying container closure lids and comprising hollow framing structure, a hopper for closure lids opening into said structure, a carriage, means suspending the carriage in said structure for reversibly swinging the carriage between a feed position adjacent the closure lids in said hopper and a release position, a die mounted on and movable with said carriage, an extractor mechanism mounted on and movable with said carriage and disposed within said die, and actuating means for said extractor mechanism and operable when said carriage is at said feed position to actuate said extractor mechanism for picking up a closure lid and holding such lid adjacent and in register with said die and operable when said carriage is at said release position to actuate said extractor mechanism for releasing said closure lid for engagement thereof by said die.

12. In a closure machine having a support table for receiving containers supplied thereto across one edge of the table, means mounting a container-engaging stop for vertical sliding movement above and below said table at an edge thereof opposite to said one edge, bias means normally urging said stop downwardly, a rockable cradle pivotable on a horizontal axis and having a contact bar thereon at one side of said axis for engaging and moving said stop upwardly against the action of said bias means and having a reciprocable operating rod at the other side of said axis, and cyclically operable means for driving said operating rod in predetermined, timed relationship to elevate said stop above said table for engagement with a container arriving at said table.

13. In a machine for rim sealing containers of the type having an external marginal rim, a work station having a support table for the containers, an upper die above said support table, an intermittently operable conveyor having a series of pusher bars movable along a feed table extending to adjacent said support table for successively and individually engaging and advancing containers towards a predetermined position on said support table, said conveyor having a deceleration of its pusher bar greater than the deceleration of the container sliding on said table such that the container moves clear of its pusher bar, a lower die positioned in telescoping relation around said support table for upward movement to engage a container at said predetermined position on said support table, a container-engaging stop means mounted for movement to engage said container on the side thereof remote from the direction of approach of said container for locating the container in said predetermined position, intermittently operable means for momentarily positioning said stop means for engagement with the container arriving at the support table, and intermittently operable means for momentarily lifting the die upwardly into rim engagement with the container on said support table for elevating the container into engagement between said dies.

14. A mechanism for periodically and momentarily reciprocating a die in opposite vertical directions and comprising stationary guide structure providing a vertical guideway, a shaft vertically slideable in said guideway and adapted for connection to said die, connector structure fixed to the shaft at its other end, a crank pivotable about a horizontal axis and having a crank arm positively engaged with said connector structure for applying elevating and lowering forces to said shaft, first and second cam mechanisms having loose opposing engagement with said crank for applying shaft-elevating and lowering forces thereto, and cyclically operable common drive means connected for operating said cam mechanisms in sequence.

15. In a closure machine having a support table for receiving a container momentarily deposited thereon from an intermittently operable container conveyor, a closure die positioned in telescoping relation around said support table for engagement with a container thereon and vertically shiftable to cooperate with a mating die for deforming said container, stationary guide structure, a shaft vertically slidable through said guide structure and having one end connected to said closure die for reciprocating the same vertically, connector structure fixed to the shaft at its other end, a crank pivotable about a horizontal axis and having a generally horizontally extending arm positively engaged with said connector structure for applying elevating and lowering forces to said shaft and having a generally vertically extending arm, first cam mechanism having wheeled engagement along said horizontally extending arm and pivotable about a horizontal axis to apply shaft-elevating forces thereto, second cam mechanism having loose wheeled engagement against said vertically extending crank arm and rotatable about a horizontal axis to apply shaft-lowering forces thereto, and cyclically operable common drive means connected to said cam mechanisms for operating the same in sequence.

16. A covering and sealing machine for automatically applying closure lids to containers of the type having an external marginal rim, said machine comprising a closure station having a container support, intermittently operable conveyor means for advancing containers successively across said support and including means for momentarily depositing each container at a predetermined position on said support, a lower die normally positioned to engage beneath the rim of a container at said predetermined position on said support, a capping station above said support and including a main frame having a vertical side wall structure provided with guideway means, a hopper for closure lids opening into said main frame, a rock shaft journalled in said wall structure, a carriage and means pivotally suspending the carriage from said rock shaft to accommodate swinging movement thereof in a plane parallel to said guideway means, guide means on said carriage and engageable in said guideway means to control swinging movement of said carriage, cyclically operable means for rocking said rock shaft to reversibly swing said carriage between a feed position adjacent closure lids in said hopper and a release position, overlying a container on said support, extractor mechanism and an upper die mounted to said carriage, and actuating means for said extractor mechanism and operable when said carriage is at said feed position to actuate said extractor mechanism for picking up and holding a closure lid and operable when said carriage is at said release position, and with said upper die overlying said closure lid, to actuate said extractor mechanism for releasing said closure lid and means for shifting the lower die upwardly to engage and lift the container from said support to bring the container rim and closure lid into sealing engagement between said dies.

17. A capping unit for handling and applying container closure lids and comprising a main frame having vertical wall structure provided with guideway means, a hopper for closure lids opening into said main frame, a shaft supported in said wall structure and defining a horizontal pivot axis, an elongated swing mechanism having one end mounted on said shaft for swinging movement about said axis, a carriage and means pivotally suspending the carriage from said swing mechanism at a point spaced from said axis to accommodate swinging movement of the carriage in a plane parallel to said guideway means, guide means on said carriage and engageable in said guideway means to control swinging movement of said carriage, cyclically operable means for rocking said swing mechanism to reversibly swing said carriage between a feed position adjacent closure lids in said hopper and a release position, extractor mechanism mounted to said carriage and actuating means for said extractor mechanism and operable when said carriage is at said feed position to actuate said extractor mechanism for picking up and holding a closure lid and operable when said carriage is at said release position to actuate said extractor mechanism for releasing said closure lid.

18. In an article-handling mechanism, a main frame having side wall structure, a shaft supported in said side wall structure to define a pivot axis generally normal thereto, carriage structure, elongated swing mechanism having a connection to said shaft for swinging movement about said axis and having a spaced connection pivotally connected to the carriage structure to accommodate swinging movement thereof in a plane parallel to the plane of said side wall structure, guideway means extending along one of said structures in a plane parallel to the plane of swinging movement of said carriage, guide means on the other of said structures engageable in said guideway means to control swinging movement of said carriage, and means for rocking said swing mechanism about said pivot axis to reversibly swing said carriage structure through a multiplied angular movement accommodated by movement of said guide means in said guideway means.

19. In an article-handling mechanism, a main frame having side wall structure provided with generally vertically extending, smoothly curving guideway means, a rock shaft journalled in said side wall structure, a carriage, elongated swing mechanism having a first connection to said rock shaft and having a spaced pivotal connection to said carriage to accommodate swinging movement thereof, guide means on said carriage adjacent the opposite end thereof and engageable in said guideway means to move therealong in controlling swinging movement of said carriage, and means for rocking said rock shaft and support means to reversibly swing said carriage through multiplied angular movement accommodated by said guide means moving along said guideway means.

20. In a machine for automatically applying lids to containers, said machine including upper and lower dies that undergo relative closing to grip said container and closure lid in cooperable sealing engagement therebetween, a container support between said dies, a container engaging stop means movably mounted on one of said dies at a position spaced vertically from said support, intermittently operable means for momentarily moving said stop means to an operative position adjacent said support for intercepting a container travel path, intermittently operable conveyor means for sliding a container on to said support towards locating engagement with said stop means at the operative position thereof, means for decelerating the conveyor means more rapidly than the sliding container to permit the container to move free of the conveyor means as the container is delivered to the support, and intermittently operable means for supplying and supporting a closure lid at a position between said dies and directly overlying the container on said support.

References Cited in the file of this patent

UNITED STATES PATENTS

| | | |
|---|---|---|
| 2,055,704 | Pierce | Sept. 29, 1936 |
| 2,417,938 | Krueger | Mar. 25, 1947 |
| 2,539,427 | Jakob | Jan. 30, 1951 |
| 2,734,674 | Ray | Feb. 14, 1956 |
| 2,736,258 | Vedder | Feb. 28, 1956 |
| 2,765,601 | Anderson | Oct. 9, 1956 |
| 2,864,221 | Jones et al. | Dec. 16, 1958 |
| 2,928,222 | Lindsteadt | Mar. 15, 1960 |